United States Patent
Teodosio et al.

Patent Number: 6,121,966
Date of Patent: *Sep. 19, 2000

[54] NAVIGABLE VIEWING SYSTEM

[75] Inventors: Laura A. Teodosio, Derby, Conn.; Michael I. Mills, Cupertino; Mitchell A. Yawitz, Belmont, both of Calif.; Lili Cheng, New York, N.Y.

[73] Assignee: Apple Computer, Inc., Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/665,426

[22] Filed: Jun. 18, 1996

Related U.S. Application Data

[63] Continuation of application No. 08/301,046, Sep. 6, 1994, abandoned, which is a continuation of application No. 07/970,004, Nov. 2, 1992, abandoned.

[51] Int. Cl.[7] .................................................. G09G 5/34
[52] U.S. Cl. ..................... 345/346; 345/121; 345/341; 345/355; 345/357
[58] Field of Search ................................ 345/118, 127, 345/129, 130, 131, 132, 145, 146, 348, 424, 419, 439, 340, 473, 474, 326, 115, 121, 123, 124, 125, 126, 341, 346, 355, 357; 382/282, 294, 296, 298, 302; 348/36, 38, 39; 395/102, 101

[56] References Cited

U.S. PATENT DOCUMENTS

| | | | |
|---|---|---|---|
| 4,103,435 | 8/1978 | Herdon | 348/36 |
| 4,208,810 | 6/1980 | Rohner et al. | 345/427 |
| 4,485,402 | 11/1984 | Searby | 348/715 |
| 4,532,605 | 7/1985 | Waller | 345/131 |
| 4,601,003 | 7/1986 | Yoneyama et al. | 395/160 |
| 4,686,522 | 8/1987 | Hernandez et al. | 340/709 |
| 4,716,404 | 12/1987 | Tabata et al. | 340/995 |
| 4,751,507 | 6/1988 | Hama et al. | 340/724 |
| 4,752,836 | 6/1988 | Blanton et al. | 345/419 |
| 4,797,942 | 1/1989 | Burt | 382/284 |
| 4,821,211 | 4/1989 | Torres | 364/521 |
| 4,899,292 | 2/1990 | Montagna et al. | 395/147 |
| 4,935,809 | 6/1990 | Hayashi et al. | 345/145 |
| 5,014,222 | 5/1991 | Donahue | 345/121 |
| 5,027,110 | 6/1991 | Chang et al. | 345/131 |
| 5,073,771 | 12/1991 | Satta et al. | 340/721 |
| 5,075,673 | 12/1991 | Yanker | 345/123 |
| 5,130,794 | 7/1992 | Ritchey | 348/36 |
| 5,177,474 | 1/1993 | Kadota | 340/729 |
| 5,185,667 | 2/1993 | Zimmermann | 348/36 |
| 5,187,571 | 2/1993 | Braun et al. | 348/36 |
| 5,187,754 | 2/1993 | Currin et al. | 382/284 |
| 5,187,776 | 2/1993 | Yanker | 345/121 |
| 5,200,818 | 4/1993 | Neta et al. | 348/39 |
| 5,262,856 | 11/1993 | Lippman et al. | 345/415 |
| 5,262,867 | 11/1993 | Kojima | 348/39 |
| 5,274,759 | 12/1993 | Yoshioka | 395/139 |
| 5,283,562 | 2/1994 | Kaneko et al. | 345/131 |
| 5,287,437 | 2/1994 | Deering | 345/419 |
| 5,289,168 | 2/1994 | Freeman | 345/121 |
| 5,302,967 | 4/1994 | Yonezawa et al. | 345/131 |
| 5,341,466 | 8/1994 | Perlin et al. | 345/128 |
| 5,367,614 | 11/1994 | Bisey | 345/419 |
| 5,394,520 | 2/1995 | Hall | 345/435 |
| 5,504,853 | 4/1996 | Schuur et al. | 345/340 |
| 5,657,402 | 8/1997 | Bender et al. | 382/294 |

*Primary Examiner*—Steven J. Saras
*Assistant Examiner*—Paul A. Bell
*Attorney, Agent, or Firm*—Edward W. Scott, IV

[57] ABSTRACT

A method, system and program for creating an overview image display of an environment or series of images and a detail window into the overview image display. The detail window consists of a single frame of the overview image or some corresponding image to present additional detail of the selected portion of the overview image. Additional features include the ability to interactively reposition a pointer to select another detail window corresponding to another area of the overview image. Further capabilities are provided to store selective reference points as a user interactively selects the reference points and play them back at some user initiated later time. To aid the user, the interactive selections are identified by a series of area indicias left on the display.

78 Claims, 7 Drawing Sheets

NAVIGABLE VIEWING SYSTEM

This is a continuation of application Ser. No. 07/970,004 filed on Nov. 2, 1992 now abandoned. This is a continuation of application(s) Ser. No. 08/301,046 filed on Sep. 6, 1994, now abandoned.

FIELD OF THE INVENTION

This invention generally relates to improvements in multimedia presentation systems and more particularly to a system for navigating through an image or series of images.

BACKGROUND OF THE INVENTION

Computers are finding increasing acceptance as tools for creating, editing and presenting multimedia presentations. An early example of a tool that addressed some of these requirements is disclosed in U.S. Pat. No. 4,686,522 to Hernandez et al. This patent presented a technique for editing graphic objects in an interactive draw graphic system. A mixed text and graphic environment with a primitive ergonomic user interface was taught in this patent.

Another example of an improved graphical, computer interface is disclosed in U.S. Pat. No. 4,821,211 to Torres et al. This patent disclosed an ability to navigate rough a disk directory using a tree structure and directly invoke particular applications selected by a user.

Creating a salient still picture formed from a series of still frame pictures has also been discussed in, Teodosio, L. and Bender, W., Salient Stills From Video, Proc. of 45th Annual Imaging Science and Technology Conference, May, 1992. This article discussed techniques for forming an overview image of a scene from a series of still pictures.

There is no disclosure in the prior art that applicant is aware of that teaches the use of a detail window displaying a corresponding image selected from an overview image, or the ability to navigate through the overview image using the detail window to assist the user.

SUMMARY OF THE INVENTION

Accordingly, it is a primary objective of the present invention to provide a system for creating an overview image of an environment or series of images and a detail window into the overview image. The detail window consists of an image corresponding to an area on the overview image. The detail window presents additional information for the selected portion of the overview image. Additional features include the ability to interactively reposition a pointer to select another detail window corresponding to another area of the overview image. Further capabilities are provided to store selective reference points as a user interactively selects the reference points and play them back at some user initiated later time. To aid the user, the interactive selections are identified by a series of area indicias, such as geometric figure outlines, placed on the display as the cursor traverses the display.

DETAILED DESCRIPTION OF THE INVENTION

Figure 1:
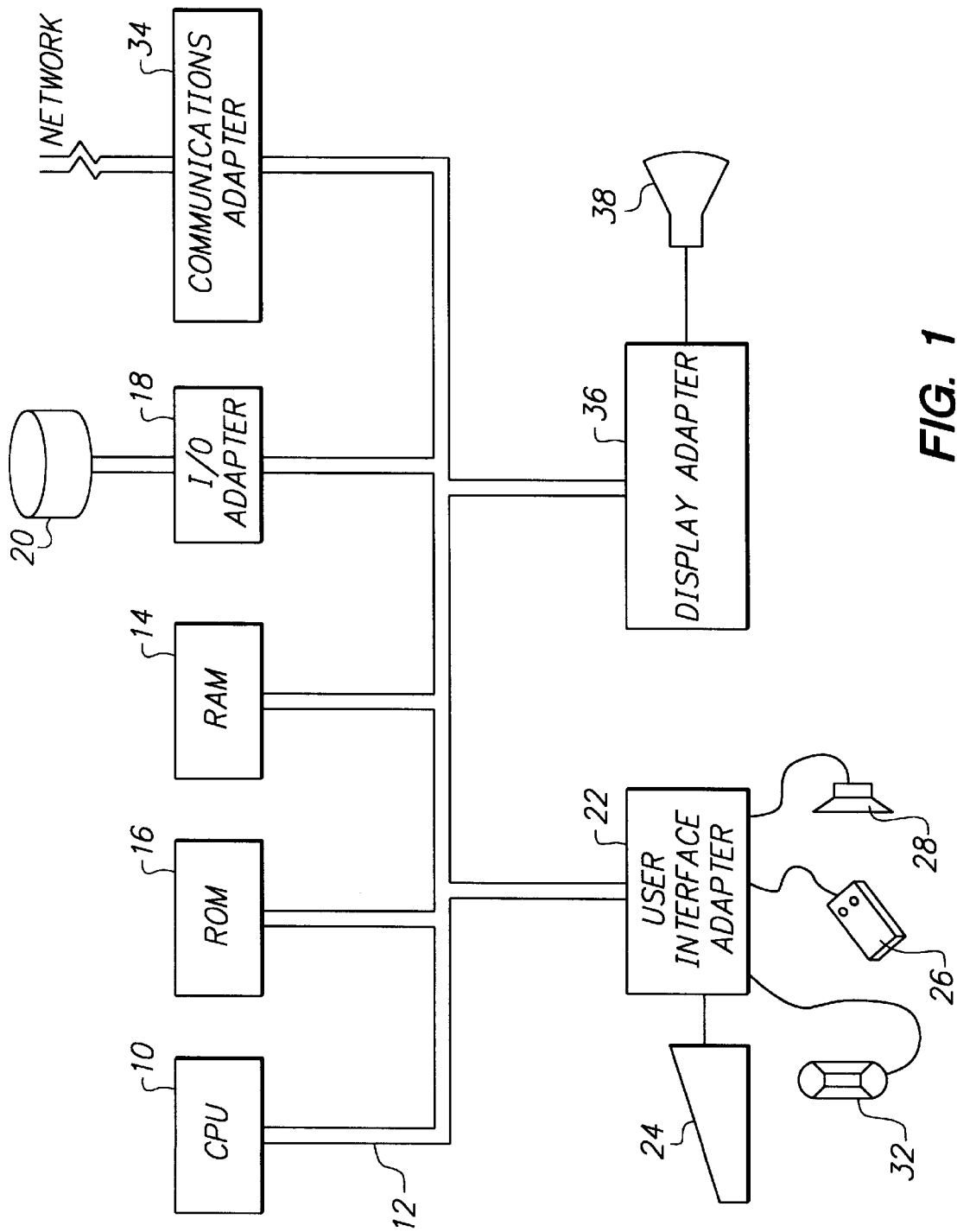
FIG. 1 is a block diagram of a personal computer system in accordance with the subject invention.

The invention is preferably practiced in the context of an operating system resident on a personal computer such as an Apple®Macintosh® computer. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the Apple System/7 operating system.

Figure 2:
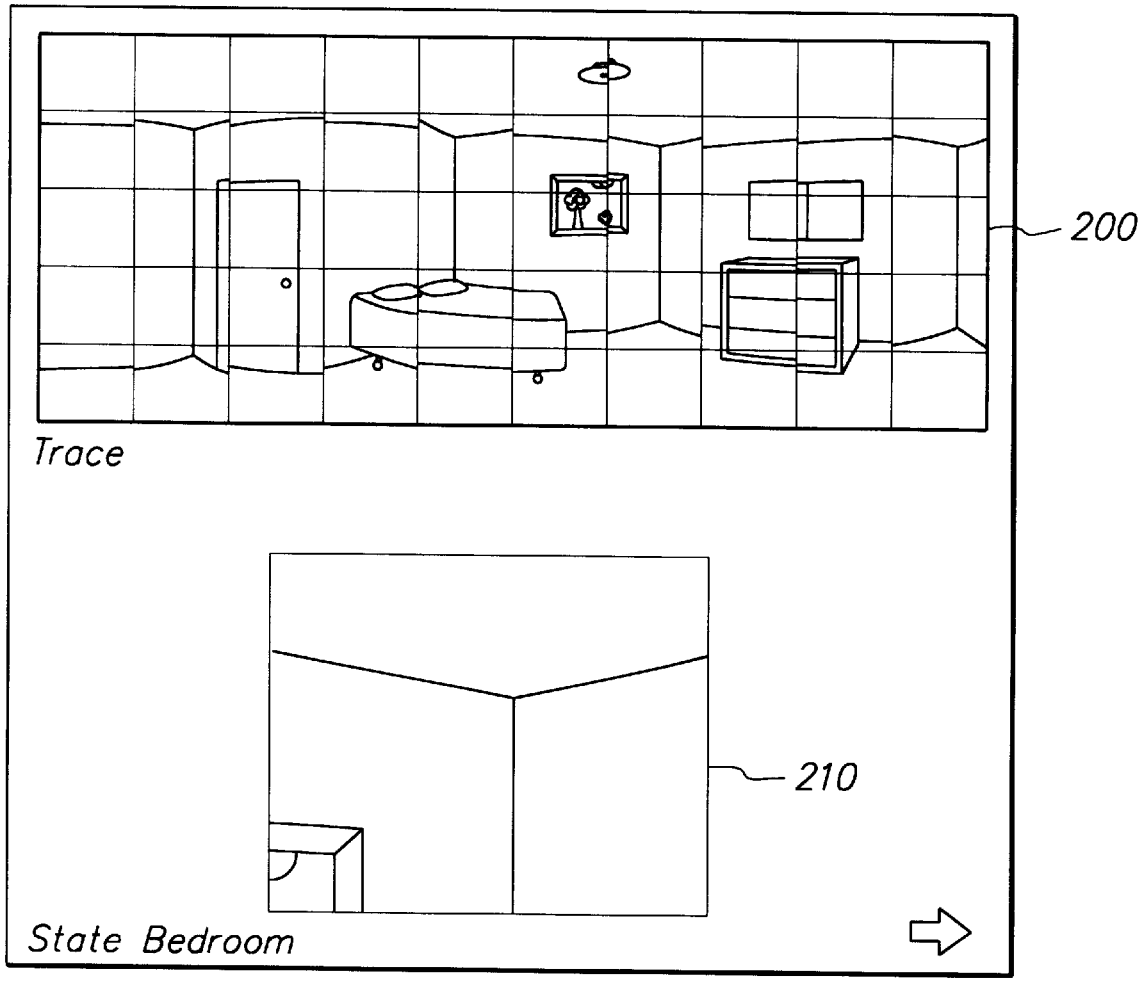
FIG. 2 illustrates an overview display and a detail window in accordance with the subject invention.
Figure 2A:
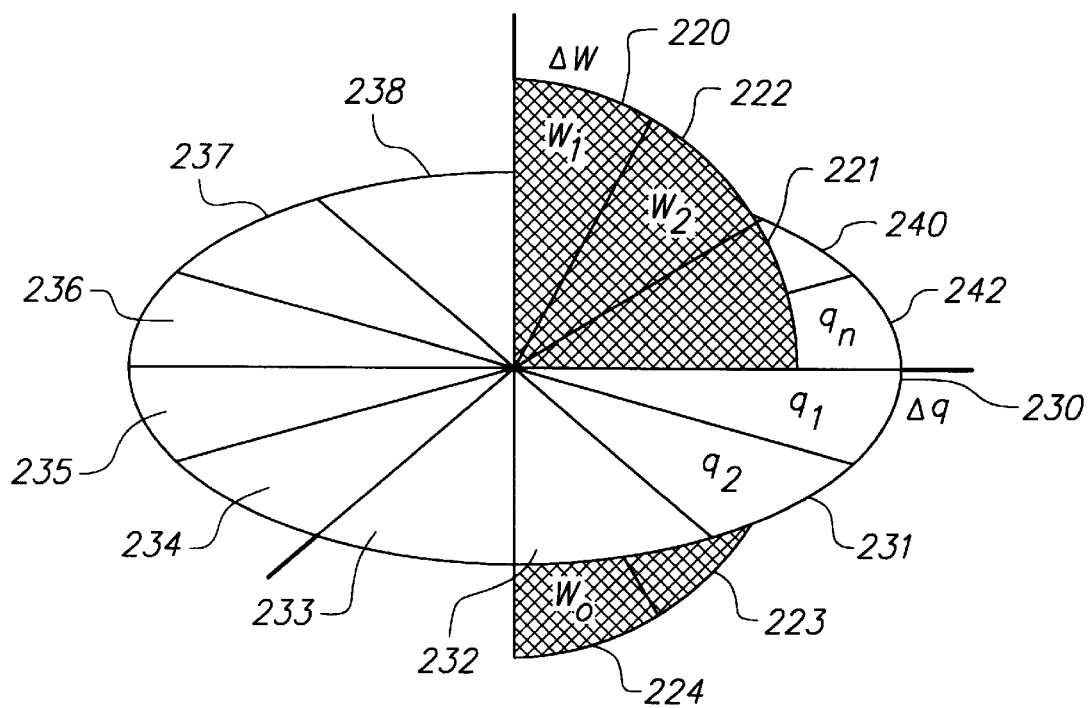
FIG. 2A illustrates a spherical image space divided into a series of w rows and q columns, with the rows and columns representing individual frames as photographed from a video camera.

FIG. 2 illustrates an overview display 200 and a detail window 210 in accordance with the subject invention. The overview image display 200 is a view representative of a three-hundred-sixty degree rotation around a particular point in a space. While a complete rotational view is used in the preferred embodiment, one of ordinary skill in the computer arts will readily comprehend that a semi-circular pan or other sequence of images could be substituted for the 360 degree rotation without departing from the subject invention. The vantage point is where the camera was located as it panned the space. Usually the scene is captured in a spherical fashion as the camera pans around the space in a series of rows as depicted in FIG. 2A. The space is divided into w rows 220–224 and q columns 230–242 with each q representing another single frame as shown in FIG. 2A.

Figure 2B:
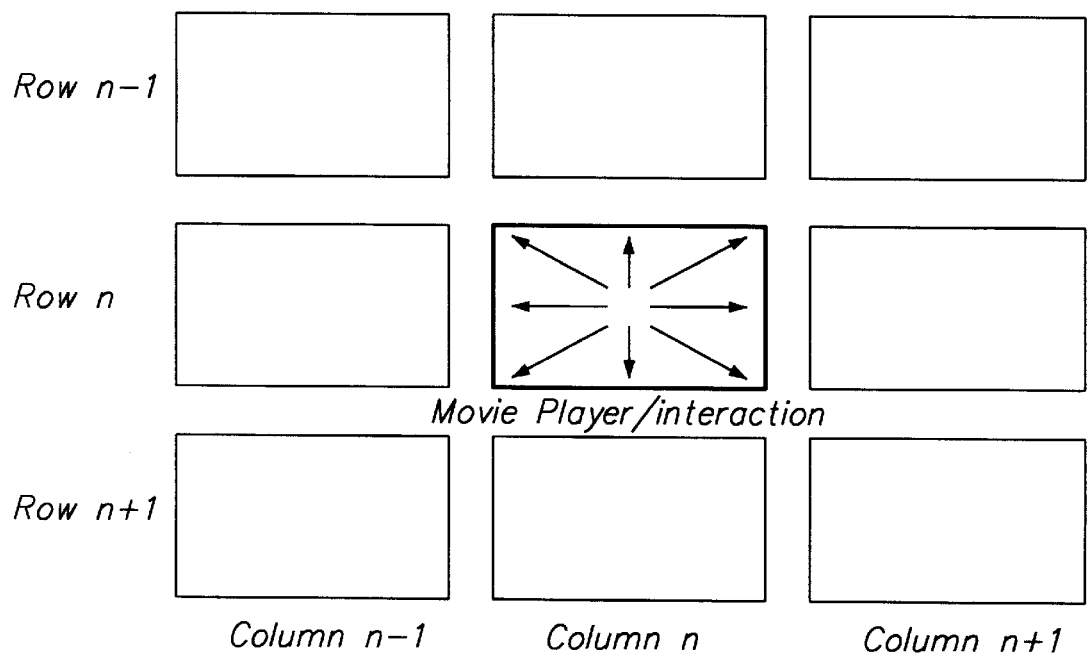
FIG. 2B illustrates the two-dimensional representation of the spherical image space of FIG. 2A into rows and columns of image frames.

The subject invention uses Quicktime® digital video which executes in a HyperCard® stack. The user control over the scene is provided by clicking the mouse inside a Quicktime movie. Movement from a frame in the overview image display to another frame is in one of eight directions as shown in FIG. 2B. The user interacts with the video representation of the space one frame at a time. Each individual frame is an image of one of the pictures taken to capture the space as discussed above. The individual frames are pieced together using the method and systems discussed below with reference to the flowcharts and the source code.

Interacting with a video one frame at a time results in the ability to present a detailed view of the space, but there are severe limitations. First, the interaction results in a form of tunnel vision. The user can only experience the overview image display as it unfolds a single frame at a time. No provision for viewing an overview or browsing a particular area are provided. Determining where the current location in the image display is, or where past locations were in the overview image display is extremely difficult. The subject invention overcomes these limitations and creates a motif not dissimilar to the natural feeling a person experiences as one walks into a room.

Another limitation of a simple overview viewer is that there is no random access means. The frames can only be viewed sequentially as the overview image display is unfolded. The subject invention overcomes this problem by providing the tools to browse, randomly select and trace selected images associated with any overview image.

Figure 3:
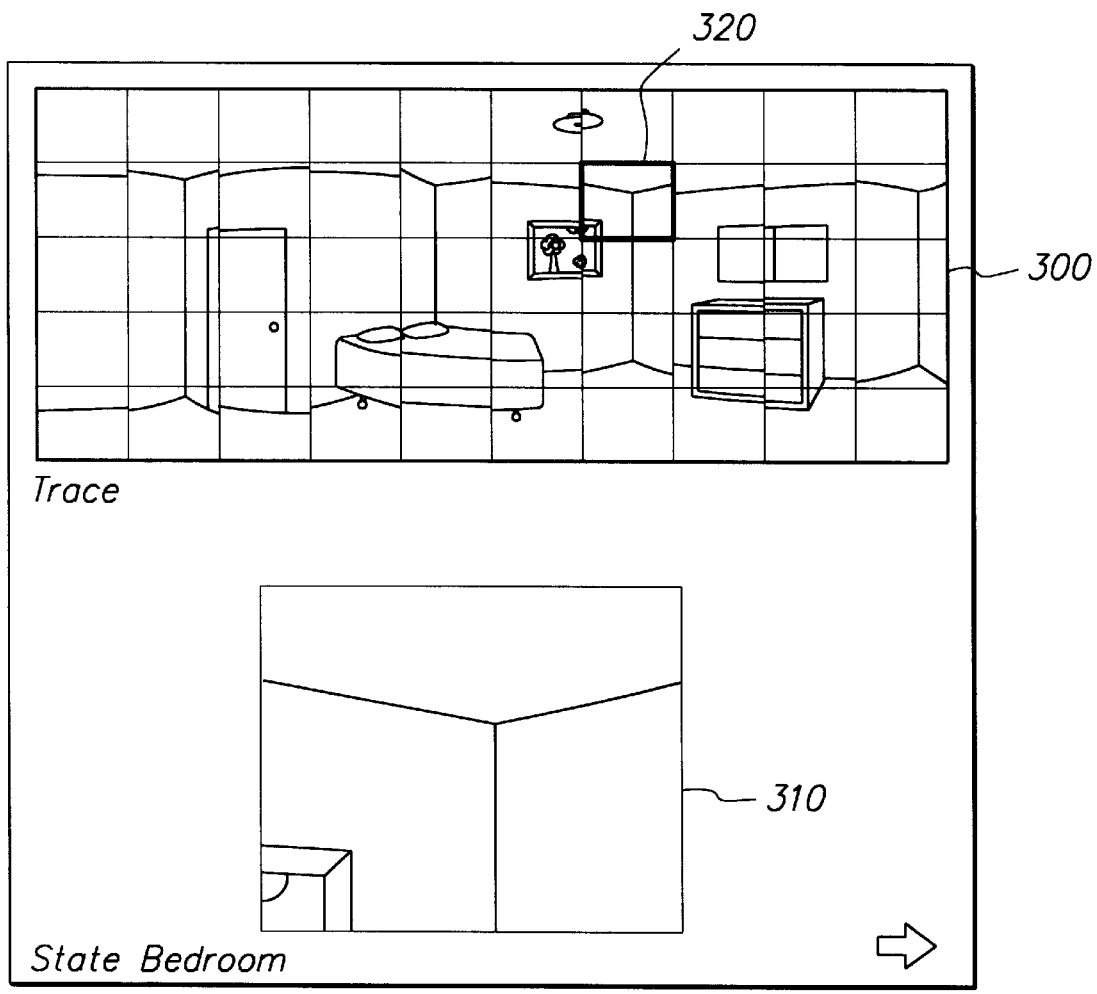
FIG. 3 illustrates an overview display, a detail window and a corresponding area indicia (geometric figure outline) in accordance with the subject invention.

FIG. 3 illustrates an overview image 300, a detail window 310 and a corresponding area indicia, in this case a geometric figure outline 320, in accordance with the subject invention. The detail window 310 corresponds to an enlarged image associated with the area bounded by the geometric figure outline 320 in the overview image 300. As the cursor is moved, the location within the overview image 300, is highlighted using the geometric figure outline 320 to clearly convey what location the detail window 310 corresponds to. One of ordinary skill in the computer arts will readily comprehend that reverse videoing the area instead of enclosing it with a geometric figure would work equally well. Differentiating the area with color could also be used without departing from the invention. A user can select any position within the overview image, press the cursor selection device's button (for example, the mouse button), and an enlarged image corresponding to the particular area in the overview display is presented in the detail window 310. Thus, random access of particular frames corresponding to the overview image is provided.

Figure 4:
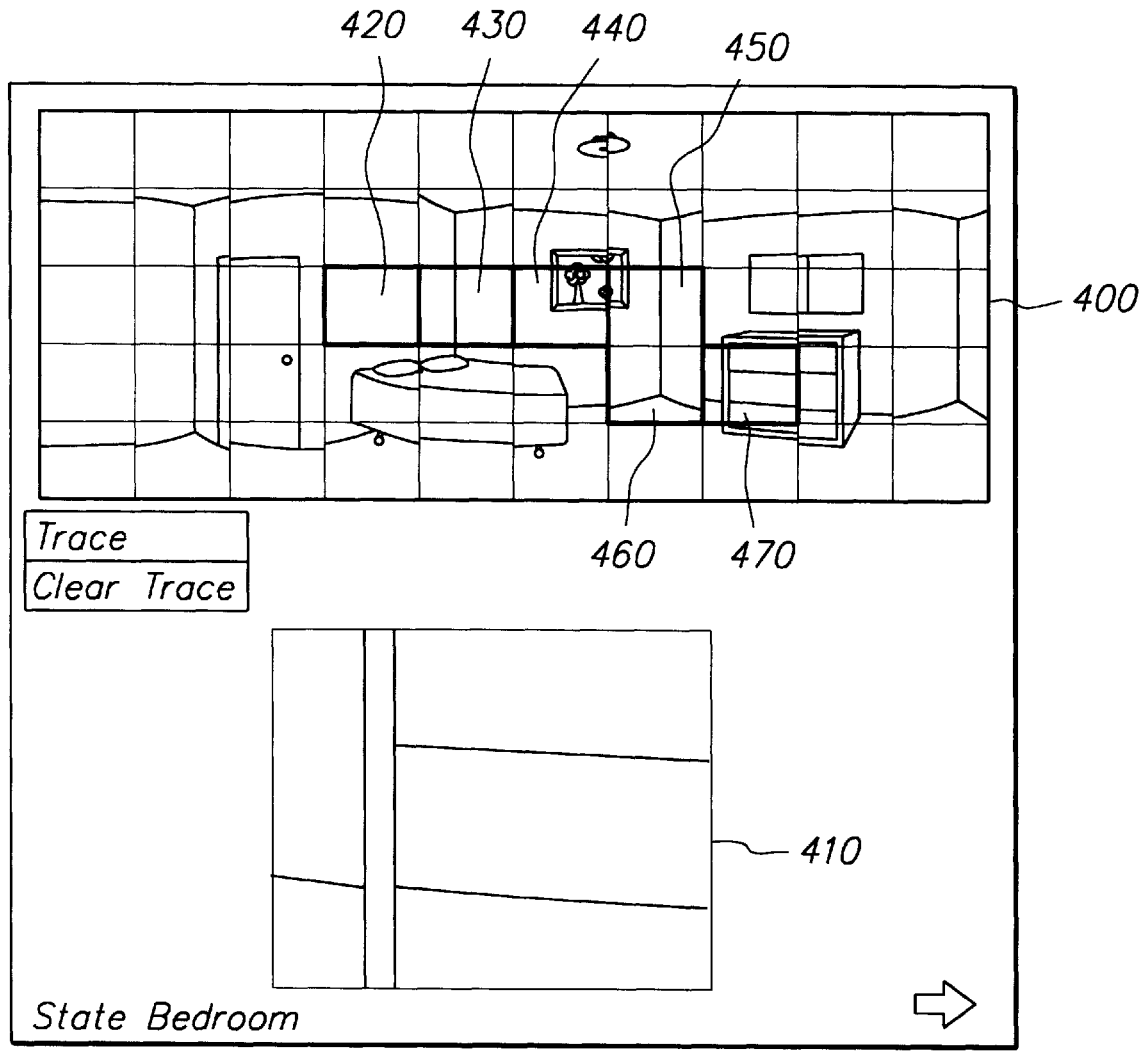
FIG. 4 illustrates a series of saved geometric figure outlines corresponding to user selections in tracing through an overview image display for subsequent playback in accordance with the subject invention.

FIG. 4 illustrates a series of saved geometric figure outlines corresponding to user selections in tracing through an overview display for subsequent playback in accordance with the subject invention. The overview image 400 has a detail window 410 with an enlarged image of the last location selected in the overview image 470. Each of the other cursor locations traversed in the overview image 420,430,440,450 and 460 are also enclosed by an outline of a geometric figure to present a trace to the user. Each of the cursor locations is saved, and since each corresponds to a particular frame of the overview image, the trace of frames can be replayed at a subsequent time to allow another user to review the frames and experience a similar presentation. Locations in the detailed window and the overview image can also be selected to present other images associated with the image area, but not necessarily formed from the original image. For example, a china teacup may appear as a dot in a china cabinet, but when the dot is selected, a detailed image rendering of the china teacup could appear in the detailed window. Moreover, a closed door appearing in an image could be selected and result in a detailed image of a room located behind the door even if the room was not visible in the previous image. Finally, areas in the detailed window can also be selected to enable further images associated with the detailed window to be revealed.

The overview image was created as discussed above. To assist one of ordinary skill in the art to make and use the invention, a more detailed discussion of the necessary processing is presented below with reference to FIG. 5, FIG. 6 and the source code.

Figure 5:
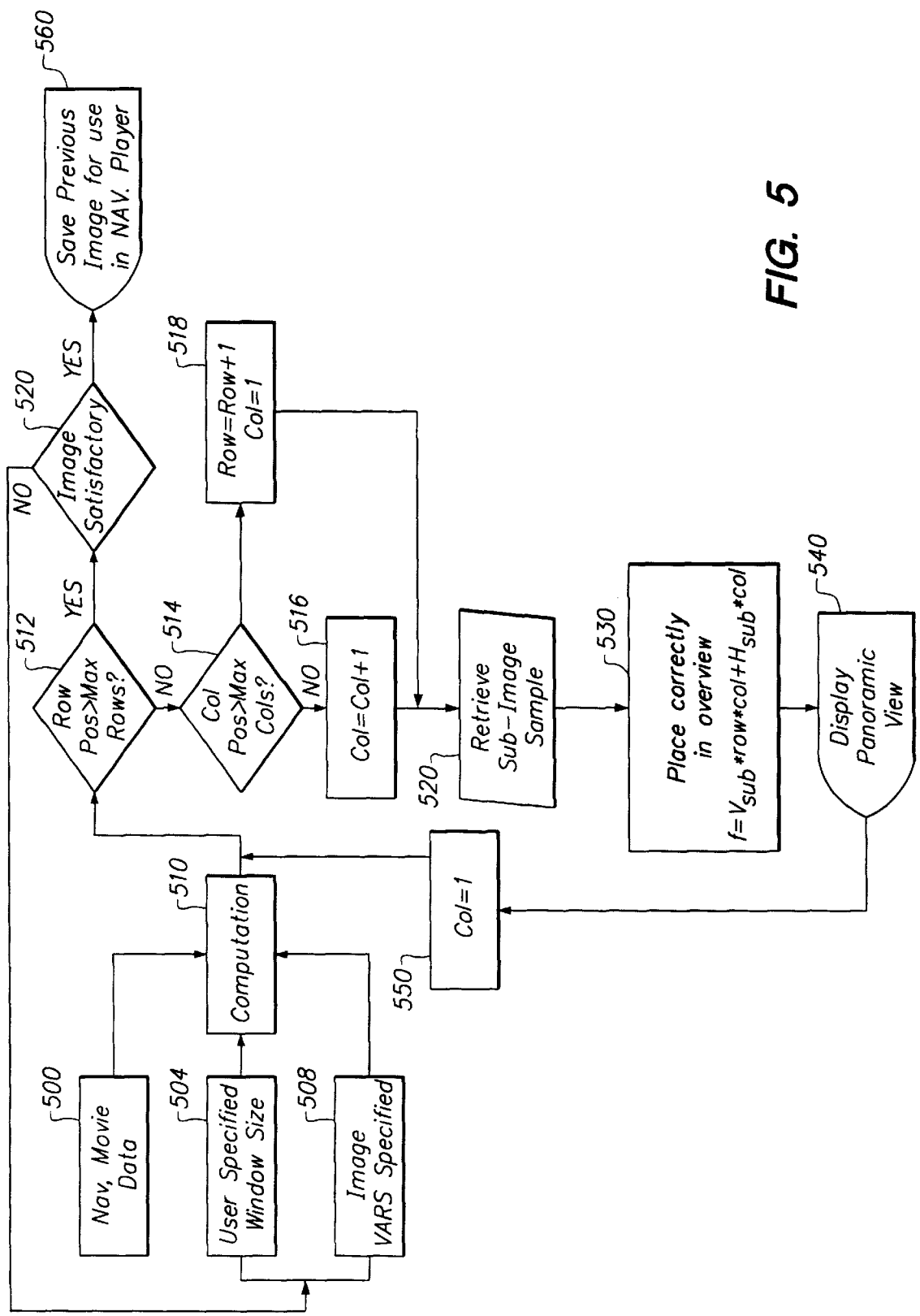
FIG. 5 is a flowchart providing a logical process for building an overview image in accordance with the subject invention.

FIG. 5 is a flowchart providing a logical process for building an overview image display in accordance with the subject invention. Navigable movie data in the form of images that have been input into the computer to form individual images that are processed at function block 500. User specified window size (horizontal dimension and vertical dimension) are entered at function block 504. Image variables are specified (horizontal sub-sampling rate, vertical sub-sampling rate, horizontal and vertical overlap of individual frame images, and horizontal and vertical clip (the number of pixels are clipped from a particular frame in the x and y plane)) in function block 508. Function blocks 500,504 and 508 are fed into the computation function block 510 where the individual frames are scaled for each row and column, and the row and column variables are each initialized to one.

Then a nested loop is invoked to create the overview image. First, at decision block 512, a test is performed to determine if the maximum number of rows has been exceeded. If so, then the overview image is tested to determine if its quality is satisfactory at decision block 520. If the quality is insufficient, the user is given an opportunity to adjust the initial variables at function blocks 504 and 508 and the processing is repeated. However, if the image is of sufficient quality, it is saved and displayed for use by the system.

If the maximum rows has not been exceeded as detected in decision block 512, then another test is performed at decision block 514 to determine if the column maximum has been exceeded. If so, then the row variable is incremented and the column variable is reset to one at function block 518 and control flows to input block 520. If the column maximum has not been exceeded, then the column variable is incremented and the sub-image sample frame is retrieved at input block 520. Then, in function block 530, as detailed in the code provided below, the frame is inserted correctly in the overview image. The frame is inserted at the location corresponding to (Vsub * row * col)+Hsub * col; where row and col refer to the variables incremented in the nested loop, and Vsub and Hsub are user specified variables corresponding to the horizontal and vertical sub sampling rate. Finally, the incremental overview image is displayed based on the newly inserted frame as shown in display block 540. Then, the column variable is reset to one and processing is passed to decision block 512.

The computer system corresponding to the subject invention is interactive. The user guesses at some set of parameters, builds the overview image, and decides if the image is satisfactory. If the image is not satisfactory, then variables are adjusted and the image is recreated. This process is repeated until a satisfactory image results, which is saved with its associated parameters. The picture and the parameters are then input to the next set of logic.

Figure 6:
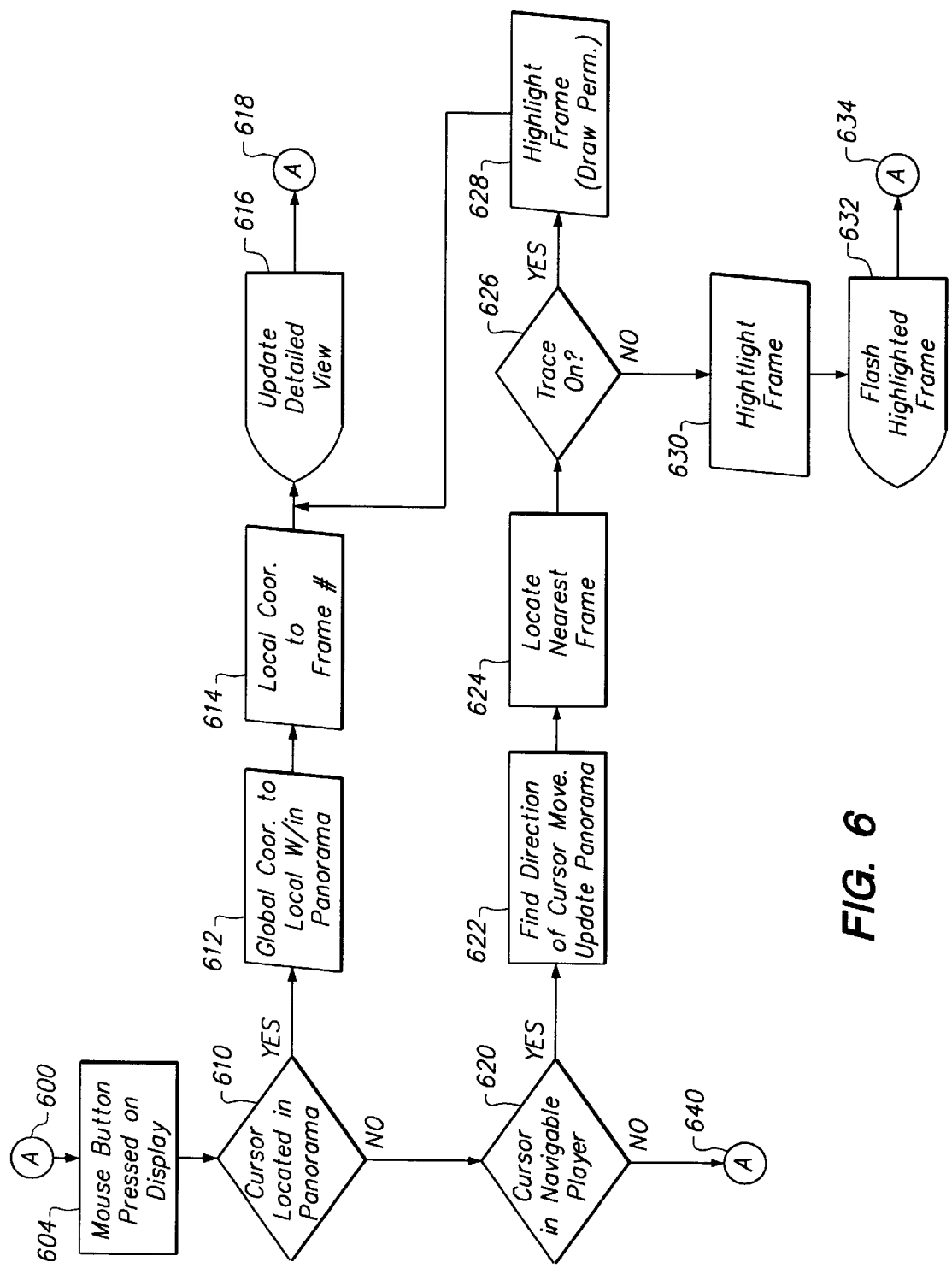
FIG. 6 is a flowchart providing a logical process for playback interaction in accordance with the subject invention.

FIG. 6 is a flowchart providing a logical process for playback interaction in accordance with the subject invention. Playback interaction commences at label 600 which immediately flows into function block 604 to detect if a mouse button was pressed. When a button pressed is detected, a test is performed to determine if a cursor is positioned in the overview portion of the display. If so, then the global coordinates are converted to overview image coordinates local to the overview image as shown in output block 612. The local coordinates are subsequently converted into a particular frame number as shown in output block 614. Then, the overview image is updated by displaying the frame associated with the particular location in the overview image and control flows via label 600 to function block 604 to await the next button press.

If the cursor is not detected in the overview image at decision block 610, then another test is performed at decision block 620 to determine if the cursor is located in the navigable player (detail window). If not, then control is passed back via label 600 to function block 604 to await the next mouse press. However, if the cursor is located in the detail window, then in function block 622, the direction of cursor movement is detected, in function block 624, the nearest frame is located, and at decision block 626, trace mode is tested. If trace is on, then a geometric figure is displayed at the location corresponding to the new cursor location in the overview image, the overview image is updated, and control is passed back to await the next mouse press. If trace is not on, the particular frame is still highlighted as shown in function block 630, and the highlight is flashed on the overview image as shown in output block 632. Thereafter, control is returned to await the next mouse button press.

Overview Image display Creation Code

Attached below is the source code used to generate an overview image from individual still image frames. The code is compiled using a compiler and link edited to execute under the System/7 operating system on a Macintosh computer system using a HyperCard and ThinkC. A detailed discussion of HyperCard applications is found in Goodman, Danny, *HyperCard Developer's Guide*, Bantam Books (1988).

Overview Image From Individual Frames

```
makeStill
on mouseUp global pRows,pColumns,cellHeight,cellWidth
compute general variables
    computeNavVars
compute vars specific to this handler
    put bg fld "LeftClip" into lClip
    put bg fld "TopClip" into tclip
Open and smear movie
    hide menubar
    DisposeVideo—in case one's already there
    put the rect of cd btn "preview" into pcRect
    put pcRect into pRect
    subtract lClip from item 1 of pRect subtract
    tclip from item 2 of pRect
    QTMovie OpenMovie, Direct, bg field
fileName,pRect,clipTo,pcRect
    put the result into movieID
    QTMovie Direct,movieID,Set,eraseOnMove,false
    put false into earlyExit
    put empty into fList
    put empty into rList
    repeat with v=0 to pRows-1
    repeat with h=0 to pColumns-1
compute cell rect
    put the top of bg btn "UnwrappedPict"+(v * cellHeight)
into cellTop
    put the left of bg btn "UnwrappedPict"+(h * cellWidth)
into cellLeft
    put cellLeft-lClip into item 1 of cRect
    put cellTop-tClip into item 2 of cRect
    put item 1 of cRect+cellWidth+lClip into item 3 of cRect
    put item 2 of cRect+cellHeight+tClip into item 4 of cRect
    subtract bg fld "HOverlap" * h from item 1 of cRect
    subtract bg fld "HOverlap" * h from item 3 of cRect
    subtract bg fld "VOverlap" * v from item 2 of cRect
    subtract bg fld "VOverlap" * v from item 4 of cRect
set the movie rect
    QTMovie Direct,movieID,Set,movieRect,cRect
    put cRect && tab after rList
compute the movie time
    get (v * bg fld "VSubsample" * bg fld "columns")+(h * bg
fld "hSubsample")
    put it & tab after fList
    QTMovie Direct,movieID,Set,currTime,it * bg fld
"frameDuration"
    if the mouse is down then put true into earlyExit
    if earlyExit then exit repeat
    end repeat
    if earlyExit then exit repeat
    put return after fList
    end repeat
DisposeVideo—in case one's already there
put fList into cd fld foo
    beep
    end mouseUp
computeNavVars
    on computeNavVars
    global pRows,pColumns,cellHeight,cellWidth
    global
rows,columns,frameDuration,vSubsample,hSubsample
,vOverlap,hOverla p,leftClip,topClip
get fields as globals
    put bg fld "rows" into rows
    put bg fld "columns" into columns
    put bg fld "frameDuration" into frameDuration
    put bg fld "vsubsample" into vSubsample
    put bg fld "hSubsample" into hSubsample
    put bg fld "hOverlap" into hoverlap
    put bg fld "vOverlap" into vOverlap
    put bg fld "leftClip" into leftClip
    put bg fld "topclip" into topClip
Compute some convenience variables
    put the height of bg btn "UnwrappedPict" into actual-
pHeight
    put the width of bg btn "UnwrappedPict" into actualp-
Width
    put round(rows/VSubsample) into pRows
    put round(Columns/HSubsample) into pColumns
    put actualpHeight into pHeight
    put actualpWidth into pWidth
eventually stretch as possible—do the rest of the variables.
    put round (pHeight/pRows) into cellHeight
    put round (pWidth/pColumns) into cellWidth
    end computeNavVars
```

While the invention has been described in terms of a preferred embodiment in a specific system environment, those skilled in the art recognize that the invention can be practiced, with modification, in other and different hardware and software environments within the spirit and scope of the appended claims.

What is claimed is:

1. A computer-implemented method comprising the following steps:
   a. forming an overview image comprised of a set of frames corresponding with each of a plurality of images, said overview image including a first frame corresponding with one of said plurality of images,
   b. displaying said overview image on a display simultaneously with a detail image containing said one of said plurality of images; and
   c. allowing user navigation of said plurality of images in said detail image using said detail image.

2. The method of claim 1 wherein said set of frames are scaled representations of each of said plurality of images.

3. The method of claim 2 wherein said set of frames are pieced together in said overview image.

4. The method of claim 2 wherein said set of frames are pieced together in said overview image into a panorama.

5. The method of claim 1 comprising the step of allowing user navigation of said plurality of images in said detail window using said overview image including the steps of
   a. allowing a user to move a cursor to a second frame in said overview image corresponding with a second of said plurality of images; and
   b. simultaneously displaying said overview image and said second of said plurality of images in said detail window.

6. The method of claim 5 wherein said step of allowing a user to move a cursor to said second area in said overview image includes:
   a. determining the coordinates of said second area in said overview image; and
   b. determining a frame number of said second of said plurality of images.

7. The method of claim 1 wherein said step of allowing user navigation of said plurality of images in said detail widow includes the steps of:
   a. allowing a user to move a cursor in said detail image;
   b. determining a direction of movement of said cursor,
   c. determining a second image in said plurality of images which corresponds with the direction of movement of said cursor; and
   d. simultaneously displaying said overview image and said detail image containing said second of said plurality of images.

8. The method of claim 7 wherein said step of displaying said overview image includes the step of highlighting a second frame in said overview image which corresponds with said second of said plurality of images.

9. The method of claim 8 comprising the step of maintaining said highlighting of said second frame during said user navigation of said plurality of images.

10. The method of claim 9 wherein said highlighting traces said user navigation of said plurality of images.

11. The method of claim 8 comprising the step of tracing said user navigation of said plurality of images.

12. The method of claim 7 comprising the step of tracing said user navigation of said plurality of images.

13. The method of claim 12 comprising the step of storing said tracing of said user navigation of said plurality of images.

14. The method of claim 13 comprising the step of playing back said user navigation by said user of said plurality of images.

15. The method of claim 12 comprising the step of highlighting of said frames during said tracing of said user navigation of said plurality of images.

16. The method of claim 15 comprising the step of maintaining said highlighting said frames during said tracing of said user navigation of said plurality of images.

17. The method of claim 1 comprising the step of tracing said user navigation of said plurality of images.

18. The method of claim 17 comprising the step of storing said tracing of said user navigation of said plurality of images.

19. The method of claim 18 comprising the step of playing back said user navigation of said plurality of images.

20. The method of claim 17 comprising the step of highlighting frames in said overview image during said tracing of said user navigation of said plurality of images.

21. The method of claim 20 comprising the step of maintaining said highlighting of said frames during said user navigation of said plurality of images.

22. The method of claim 1 wherein said plurality of images comprises a sequence of images of a panorama.

23. The method of claim 22 wherein said panorama comprises a spherical panorama.

24. The method of claim 22 wherein said panorama comprises a semi-circular panorama.

25. The method of claim 1 wherein said step of displaying said overview image includes highlighting said first frame in said overview image.

26. The method of 1 wherein said step of allowing user navigation of said plurality of images in said detail image includes highlighting frames in said overview image which correspond to images in said plurality of images which are navigated to during said user navigation.

27. A machine-readable medium configured to cause a computer to perform a method comprising the following steps:
   a. forming an overview image comprised of a set of frames corresponding with each of a plurality of images, said overview image including a first frame corresponding with one of said plurality of images;
   b. displaying said overview image on a display simultaneously with a detail image containing said one of said plurality of images; and
   c. allowing user navigation of said plurality of images in said detail image using said detail image.

28. The machine-readable medium of claim 27 wherein said set of frames are scaled representations of each of said plurality of images.

29. The machine-readable medium of claim 28 wherein said set of frames are pieced together in said overview image.

30. The machine-readable medium of claim 28 wherein said set of frames an pieced together in said overview image into a panorama.

31. The machine-readable medium of claim 27 configured to cause a step of allowing user navigation of said plurality of images in said detail window using said overview image including the steps of:
   a. allowing a user to move a cursor to a second frame in said overview image corresponding with a second of said plurality of images; and
   b. simultaneously displaying said overview image and said second of said plurality of images in said detail window.

32. The machine-readable medium of claim 31 wherein said step of allowing a user to move a cursor to said second area in said overview image includes:
   a. determining the coordinates of said second area in said overview image; and
   b. determining a frame number of said second of said plurality of images.

33. The machine-readable medium of claim 27 wherein said step of allowing user navigation of said plurality of images in said detail window includes the steps of:
   a. allowing a user to move a cursor in said detail image;
   b. determining a direction of movement of said cursor,
   c. determining a second image in said plurality of images which corresponds with the direction of movement of said cursor; and
   d. simultaneously displaying said overview image and said detail image containing said second of said plurality of images.

34. The machine-readable medium of claim 28 wherein said step of displaying said overview image includes the step of highlighting a second frame in said overview image which corresponds with said second of said plurality of images.

35. The machine-readable medium of claim 34 configured to cause the step of maintaining said highlighting of said second frame during said user navigation of said plurality of images.

36. The machine-readable medium of claim 35 wherein said highlighting traces said user navigation of said plurality of images.

37. The machine-readable medium of claim 34 configured to cause the step of tracing said user navigation of said plurality of images.

38. The machine-readable medium of claim 33 configured to cause the step of tracing said user navigation of said plurality of images.

39. The machine-readable medium of claim 38 configured to cause the step of storing said tracing of said user navigation of said plurality of images.

40. The machine-readable medium of claim 39 configured to cause the step of playing back said user navigation by said user of said plurality of images.

41. The machine-readable medium of claim 38 configured to cause the step of highlighting said frames during said tracing of said user navigation of said plurality of images.

42. The machine-readable medium of claim 41 configured to cause the step of maintaining said highlighting of said frames during said tracing of said user navigation of said plurality of images.

43. The machine-readable medium of claim 27 configured to cause the step of the step of tracing said user navigation of said plurality of images.

44. The machine-readable medium of claim 43 configured to cause the step of storing said tracing of said user navigation of said plurality of images.

45. The machine-readable medium of claim 44 configured to cause the step of playing back said user navigation of said plurality of images.

46. The machine-readable medium of claim 43 configured to cause the step of highlighting frames in said overview image during said tracing of said user navigation of said plurality of images.

47. The machine-readable medium of claim 46 configured to cause the step of maintaining said highlighting of said frames during said user navigation of said plurality of images.

48. The machine-readable medium of claim 27 wherein said plurality of images comprises a sequence of images of a panorama.

49. The machine-readable medium of claim 48 wherein said panorama comprises a spherical panorama.

50. The machine-readable medium of claim 48 wherein said panorama comprises a semicircular panorama.

51. The machine-readable medium of claim 27 wherein said step of displaying said overview image includes highlighting said fist frame in said overview image.

52. The machine-readable medium of claim 27 wherein said step of allowing user navigation of said plurality of images in said detail image includes highlighting frames in said overview image which correspond to images in said plurality of images which are navigated to during said user navigation.

53. An apparatus comprising:
 a. means for forming an overview image comprised of a set of frames corresponding wit each of a plurality of images, said overview image including a first free corresponding with one of said plurality of images;
 b. means for displaying said overview image on a display simultaneously with a detail image containing said one of said plurality of images; and
 c. means for allowing user navigation of said plurality of images in said detail image using said detail image.

54. The apparatus of claim 53 wherein said set of frames are scaled representations of each of said plurality of images.

55. The apparatus of claim 54 wherein said set of frames are pieced together in said overview image.

56. The apparatus of claim 54 wherein said set of frames are pieced together in said overview image into a panorama.

57. The apparatus of claim 53 comprising a means for allowing user navigation of said plurality of images in said detail window using said overview image including:
 a. means for allowing a user to move a cursor to a second frame in said overview image corresponding with a second of said plurality of images; and
 b. means for simultaneously displaying said overview image and said second of said plurality of images in said detail window.

58. The apparatus of claim 1 wherein said means for allowing a user to move a cursor to said second area in said overview image includes:
 a. means for determining the coordinates of said second area in said overview image; and
 b. means for determining a frame number of said second of said plurality of images.

59. The apparatus of claim 53 wherein said means for allowing user navigation of said plurality of images in said detail window includes:
 a. means for allowing a user to move a cursor in said detail image;
 b. means for determining a direction of movement of said cursor,
 c. means for determining a second image in said plurality of images which corresponds with the direction of movement of said cursor; and
 d. means for simultaneously displaying said overview image and said detail image containing said second of said plurality of images.

60. The apparatus of claim 59 wherein said means for displaying said overview image includes a means for highlighting a second frame in said overview image which corresponds with said second of said plurality of images.

61. The apparatus of claim 60 comprising a means for maintaining said highlighting of said second frame during said user navigation of said plurality of images.

62. The apparatus of claim 61 wherein said highlighting traces said user navigation of said plurality of images.

63. The apparatus of claim 60 comprising a means for tracing said user navigation of said plurality of images.

64. The apparatus of claim 59 comprising a means for tracing said user navigation of said plurality of images.

65. The apparatus of claim 64 comprising a means for storing said tracing of said user navigation of said plurality of images.

66. The apparatus of claim 65 comprising a means for playing back said user navigation by said user of said plurality of images.

67. The apparatus of claim 64 comprising a means for highlighting of said frames during said tracing of said user navigation of said plurality of images.

68. The apparatus of claim 67 comprising a means for maintaining said highlighting said frames during said tracing of said user navigation of said plurality of images.

69. The apparatus of claim 53 comprising a means for tracing said user navigation of said plurality of images.

70. The apparatus of claim 69 comprising a means for storing said tracing of said user navigation of said plurality of images.

71. The apparatus of claim 70 comprising a means for playing back said user navigation of said plurality of images.

72. The apparatus of claim comprising a means for highlighting frames in said overview image during said tracing of said user navigation of said plurality of images.

73. The apparatus of claim 72 comprising a means for maintaining said highlighting of said frames during said user navigation of said plurality of images.

74. The apparatus of claim 53 wherein said plurality of images comprises a sequence of images of a panorama.

75. The apparatus of claim 74 wherein said panorama comprises a spherical panorama.

76. The apparatus of claim 75 wherein said panorama comprises a semicircular panorama.

77. The apparatus of claim 53 wherein said means for displaying said overview image includes a means for highlighting said first frame in said overview image.

78. The apparatus of claim 53 wherein said means for allowing user navigation of said plurality of images in said detail image includes a means for highlighting frames in said overview image which correspond to images in said plurality of images which are navigated to during said user navigation.

* * * * *

UNITED STATES PATENT AND TRADEMARK OFFICE
CERTIFICATE OF CORRECTION

PATENT NO      :    6,121,966

DATED          :    Sep. 19, 2000

INVENTOR(S)    :    Teodosio et al.

It is certified that error appears in the above-identified patent and that said Letters Patent are hereby corrected as shown below:

In the Claims:

Claim 50, Column 9, Line 53, please delete "semicircular" and insert - -semi-circular- - in its place.

Claim 51, Column 9, Line 56, please delete "fist" and insert - -first- - in it's place.

Claim 53, Column 9, Line 65, please delete "wit" and insert - -with- - in it's place.

Claim 53, Column 9, Line 66, please delete "free" and insert - -frame- - in it's place.

Claim 72, Column 11, Line 14, after the word claim insert - -69- -.

Claim 76, Column 12, Line 6, please delete "semicircular" and insert - - semi-circular- - in it's place.

Signed and Sealed this

Eighth Day of May, 2001

*Attest:*

NICHOLAS P. GODICI

*Attesting Officer*    *Acting Director of the United States Patent and Trademark Office*